(12) United States Patent
Angelopoulos et al.

(10) Patent No.: US 7,404,914 B2
(45) Date of Patent: Jul. 29, 2008

(54) POLYCRYSTALLINE CONDUCTING POLYMERS HAVING ADJUSTABLE MORPHOLOGY AND PROPERTIES

(75) Inventors: Marie Angelopoulos, Cortlandt Manor, NY (US); Bruce Kenneth Furman, Poughguang, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/727,615

(22) Filed: Dec. 1, 2000

(65) Prior Publication Data

US 2002/0158231 A1    Oct. 31, 2002

Related U.S. Application Data

(63) Continuation of application No. 09/268,527, filed on Mar. 12, 1999, now Pat. No. 6,210,606, which is a continuation of application No. 08/620,618, filed on Mar. 22, 1996, now Pat. No. 5,932,143.

(60) Provisional application No. 60/007,688, filed on Nov. 29, 1995.

(51) Int. Cl.
    *H01B 1/12* (2006.01)
(52) U.S. Cl. .................................................. 252/500
(58) Field of Classification Search ................. 252/500; 528/210–214, 422; 428/308.4; 524/261
    See application file for complete search history.

(56) References Cited

U.S. PATENT DOCUMENTS

| | | | | |
|---|---|---|---|---|
| 4,913,867 A | * | 4/1990 | Epstein et al. | 264/104 |
| 5,484,884 A | * | 1/1996 | MacDiarmid et al. | 528/422 |
| 5,804,100 A | * | 9/1998 | Angelopoulos et al. | 252/521 |
| 5,928,566 A | * | 7/1999 | Angelopoulos et al. | 252/500 |
| 5,932,143 A | * | 8/1999 | Angelopoulos et al. | 252/500 |
| 6,210,606 B1 | * | 4/2001 | Angelopoulos et al. | 252/500 |

FOREIGN PATENT DOCUMENTS

| | | | |
|---|---|---|---|
| WO | 92/22911 | * | 12/1992 |
| WO | 97/21228 | * | 6/1997 |

OTHER PUBLICATIONS

Handbook of Common Polymers, Roff, W.J. et al. editors, pp. 515-517. 1971.*
Kirk-Othmer Encyclopedia of Chemical Tech., 3rd ed., vol. 18, pp. 111-115, 1982.*

* cited by examiner

*Primary Examiner*—Mark Kopec
(74) *Attorney, Agent, or Firm*—Daniel P Morris

(57) ABSTRACT

Polycrystalline materials containing crystallies of precursors to electrically conductive polymers and electrically conductive polymers are described which have an adjustable high degree of crystallinity. The intersticial regions between the crystallites contains amorphous material containing precursors to electrically conductive polymers and/or electrically conductive polymers. The degree of crystallinity is achieved by preparing the materials under conditions which provide a high degree of mobility to the polymer molecules permitting them to associate with one another to form a crystalline state. This is preferable achieved by including additives, such as plasticizers and diluents, to the solution from which the polycrystalline material is formed. The morphology of the polycrystalline material is adjustable to modify the properties of the material such as the degree of crystallinity, crystal grain size, glass transition temperature, thermal coefficient of expansion and degree of electrical conductivity. High levels of electrical conductivity are achieved in the electrically conductive polycrystalline materials without stretch orienting the material. The enhanced electrical conductivity is isotropic as compared to a stretch oriented film which has isotropic electrical conductivity.

19 Claims, 8 Drawing Sheets

POLYCRYSTALLINE CONDUCTING POLYMERS HAVING ADJUSTABLE MORPHOLOGY AND PROPERTIES

CROSS REFERENCE TO RELATED APPLICATION

This application is a CON of Ser. No. 09/268,527 (filed Mar. 12, 1999, now U.S. Pat. No. 6,210,606, which application is a CON of Ser. No. 08/620,618 (filed Mar. 22, 1996, now U.S. Pat. No. 5,932,143), which application claims benefit of Ser. No 60/007,688 (filed Nov. 29, 1995).

This application claims priority from Provisional Application Ser. No. 60/007,688 filed Nov. 29, 1995.

FIELD OF THE INVENTION

The present invention is directed to polycrystalline electrically conductive polymer precursors and polycrystalline conducting polymers having adjustable morphology and properties.

BACKGROUND

Electrically conductive organic polymers emerged in the 1970's as a new class of electronic materials. These materials have the potential of combining the electronic and magnetic properties of metals with the light weight, processing advantages, and physical and mechanical properties characteristic of conventional organic polymers. Examples of electrically conducting polymers arc polyparaphenylene vinylenes, poly-paraphenylenes, polyanilines, polythiophenes, polyazines, polyfuranes, polythianaphthenes polypyrroles, polyselenophenes, poly-p-phenylene sulfides, polyacetylenes formed from soluble precursors, combinations thereof and blends thereof with other polymers and copolymers of the monomers thereof.

These polymers are conjugated systems which are made electrically conducting by doping. The doping reaction can involve an oxidation, a reduction, a protonation, an alkylation, etc. The non-doped or non-conducting form of the polymer is referred to herein as the precursor to the electrically conducting polymer. The doped or conducting form of the polymer is referred to herein as the conducting polymer.

Conducting polymers have potential for a large number of applications in such areas such as electrostatic charge/discharge (ESC/ESD) protection, electromagnetic interference (EMI) shielding, resists, electroplating, corrosion protection of metals, and ultimately metal replacements, i.e. wiring, plastic microcircuits, conducting pastes for various interconnection technologies (solder alternative), etc. Many of the above applications especially those requiring high current capacity have not yet been realized because the conductivity of the processible conducting polymers is not yet adequate for such applications.

To date, polyacetylene exhibits the highest conductivity of all the conducting polymers. The reason for this is that polyacetylene can be synthesized in a highly crystalline form (crystallinity as high as 90% has been achieved) (as reported in Macromolecules, 25, 4106, 1992). This highly crystalline polyacetylene has a conductivity on the order of $10^5$ S/cm. Although this conductivity is comparable to that of copper, polyacetylene is not technologically applicable because it is a non-soluble, non-processible, and environmentally unstable polymer.

The polyaniline class of conducting polymers has been shown to be probably the most suited of such materials for commercial applications. Great strides have been made in making the material quite processable. It is environmentally stable and allows chemical flexibility which in turn allows tailoring of its properties. Polyaniline coatings have been developed and commercialized for numerous applications. Devices and batteries have also been constructed with this material. However, the conductivity of this class of polymers is generally on the low end of the metallic regime. The conductivity is on the order of $10^0$ S/cm. Some of the other soluble conducting polymers such as the polythiophenes, poly-para-phenylenevinylenes exhibit conductivity on the order of $10^2$ S/cm. It is therefore desirable to increase the conductivity of the soluble/processible conducting polymers, in particular the polyaniline materials.

The conductivity ($\sigma$) is dependent on the number of carriers (n) set by the doping level, the charge on the carriers (q) and on the interchain and intrachain mobility ($\mu$) of the carriers.

$$\sigma = n\,q\,\mu$$

Generally, n (the number of carriers) in these systems is maximized and thus, the conductivity is dependent on the mobility of the carriers. To achieve higher conductivity, the mobility in these systems needs to be increased. The mobility, in turn, depends on the morphology of the polymer. The intrachain mobility depends on tile degree of conjugation along the chain, presence of defects, and on the chain conformation. The interchain mobility depends on the interchain interactions, the interchain distance, the degree of crystallinity, etc. Increasing the crystallinity results in increased conductivity as exemplified by polyacetylene. To date, it has proven quite difficult to attain polyaniline in a highly crystalline state. Some crystallinity has been achieved by stretch orientation or mechanical deformation (A.G. MacDiarmid et al in Synth. Met. 55-57, 753). In these stretch-oriented systems, conductivity enhancements have been observed. The conductivity enhancement was generally that measured parallel to tile stretch direction. Therefore, the conductivity in these systems is anisotropic. It is desirable to achieve a method of controlling and tuning the morphology of polyaniline. It is desirable to achieve a method of controlling and tuning the degree of crystallinity and the degree of amorphous regions in polyaniline, which in turn provides a method of tuning the physical, mechanical, and electrical properties of polyaniline. It is further desirable to achieve highly crystalline and crystalline polyaniline and to achieve this in a simple and useful manner in order to increase the mobility of the carriers and, therefore, the conductivity of the polymer. It is also further desirable to achieve isotropic conductivity, that is conductivity not dependent on direction as with stretch-oriented polyanilines.

OBJECTS

It is an object of the present invention to provide a polycrystalline material containing crystallites of an electrically conducting polymer precursor and/or electrically conducting polymer having an adjustable morphology.

It is an object of the present invention to provide a polycrystalline material of an electrically conductive polymer precursor and/or electrically conducting polymer in which the degree of amorphous and crystalline regions is adjustable.

It is an object of the present invention to provide a polycrystalline material of an electrically conducting polymer precursor and/or electrically conducting polymer having adjustable physical, mechanical, and electrical properties.

It is an object of the present invention to provide a crystalline electrically conducting polymer precursor and crystalline conducting polymers.

It is an object of the present invention to provide a highly crystalline electrically conducting polymer precursor and highly crystalline conducting polymers.

It is an object of the present invention to provide a polycrystalline material of an electrically conducting polymer precursor and/or crystalline conducting polymers to provide a highly crystalline material.

It is another object of the present invention to provide an electrically conducting polycrystalline material that exhibits enhanced carrier mobility.

It is another object of the present invention to provide an electrically conducting polycrystalline material which exhibits enhanced conductivity.

It is another object of the present invention to provide an electrically conducting polycrystalline material which exhibits enhanced isotropic conductivity.

It is another object of the present invention to provide a plasticization effect in a polycrystalline electrically conducting polymer precursors and/or electrically conducting polymers.

It is another object of the present invention to provide a polycrystalline material having an antiplasticization effect in electrically conducting polymer precursors and electrically conducting polymers.

It is another object of the present invention to provide a polycrystalline material of a precursor or electrically conducting polymer containing an additive providing mobility.

It is another object of the present invention to provide a polycrystalline material of a precursor or electrically conductive polymer containing an additive to induce all enhanced degree of crystallinity.

It is another object of the present invention to provide a non-stretch oriented polycrystalline film of a precursor or of an electrically conductive polymer which has an enhanced degree of crystallinity.

It is an object of the present invention to provide a polycrystalline material of an electrically conducting polymer precursor and/or electrically conducting polymer having an increased glass transition temperature.

It is an object of the present invention to provide an electrically conducting polymer precursor and electrically conducting polymer having an decreased glass transition temperature.

It is an object of the present invention to provide a polycrystalline material of an electrically conducting polymer precursor and electrically conducting polymer having enhanced mechanical properties.

It is an object of the present invention to provide a polycrystalline material of an electrically conducting polymer precursor and electrically conducting polymer having decrease mechanical properties.

SUMMARY OF THE INVENTION

A broad aspect of the present invention is a polycrystalline material comprising crystallites of a precursor to an electrically conductive polymer and/or an electrical conductive polymer. The intersticial regions between the crystallites contain amorphous material.

In a more particular aspect of the present invention, the amorphous regions of the material contain the additive.

DESCRIPTION OF THE DRAWINGS

Further objects, features, and advantages of the present invention will become apparent from a consideration of the following detailed description of the invention when read in conjunction with the drawings FIG's. in which.

Curve 5(a) is a Wide Angle-X-Ray Scattering (WAXS) spectrum for a polyaniline base film processed from NMP. The polymer film is essentially amorphous. Curve 5(b) is a Wide Angle X-Ray Scattering spectrum for a polyaniline base film that has stretch-oriented (l/lo=3.7). This film was derived from a gel. Curve 5(c) is a Wide Angle-X-Ray Scattering spectrum for a polyaniline-base film containing 10% poly-co-dimethyl propylamine siloxane. This film is highly crystalline.

Figure 6:
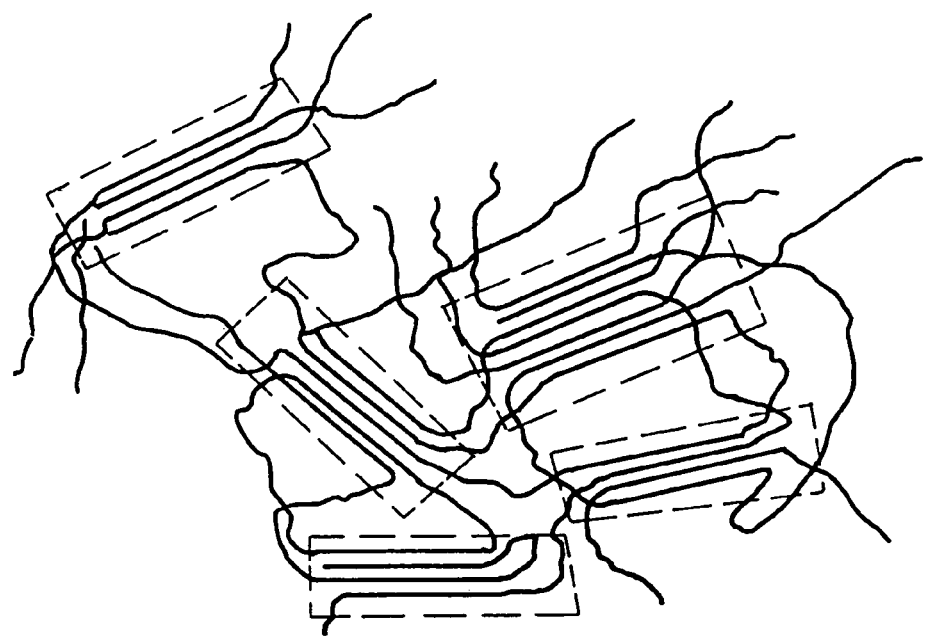
Figure 7:
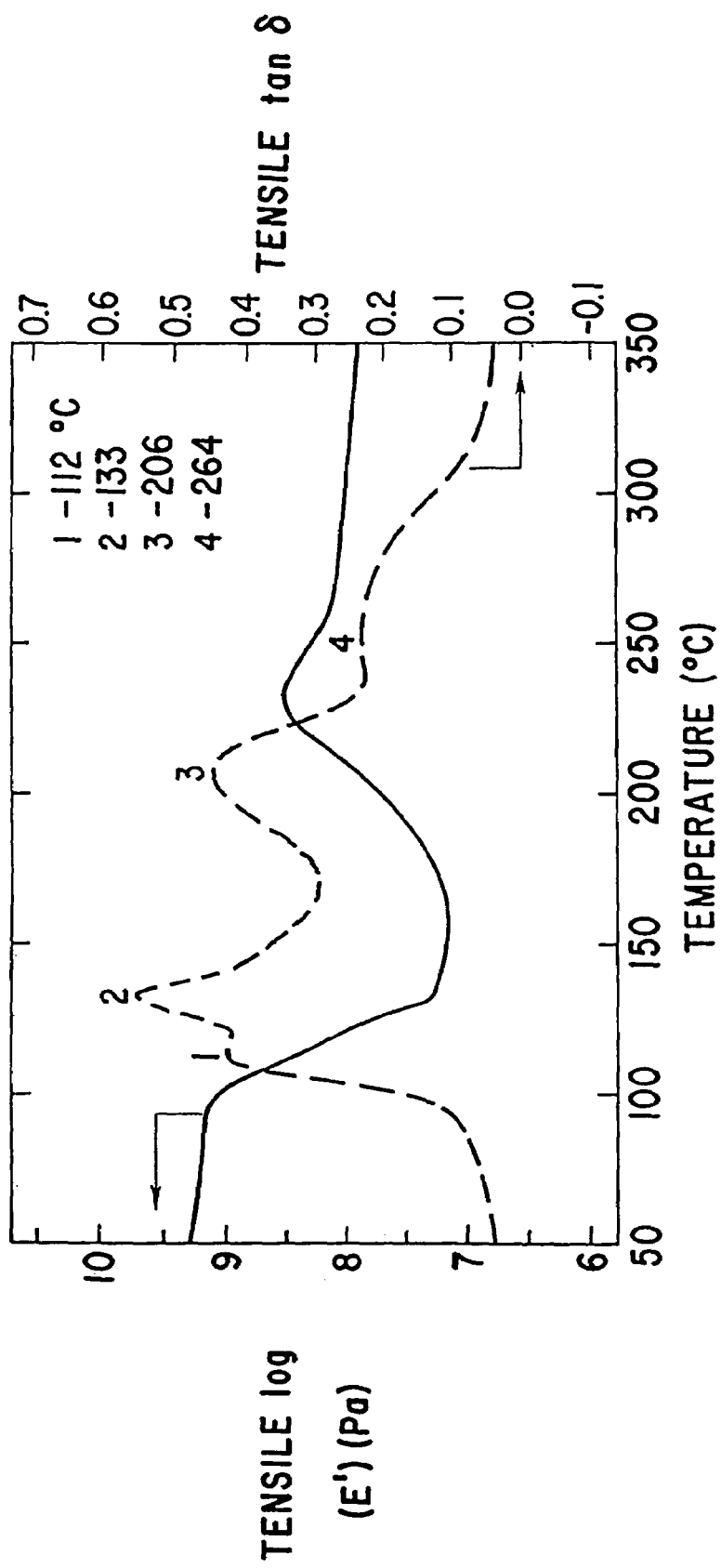

FIG. 6 is a Schematic diagram of a polycrystalline material as taught in present invention having crystalline regions (outlined in (dotted rectangles) with intersticial amorphous regions FIG. 7 is a Dynamic Mechanical Thermal Analysis (DMTA) plot for polyaniline base film cast from NMP. (First Thermal Scan; under Nitrogen).

Figure 8:
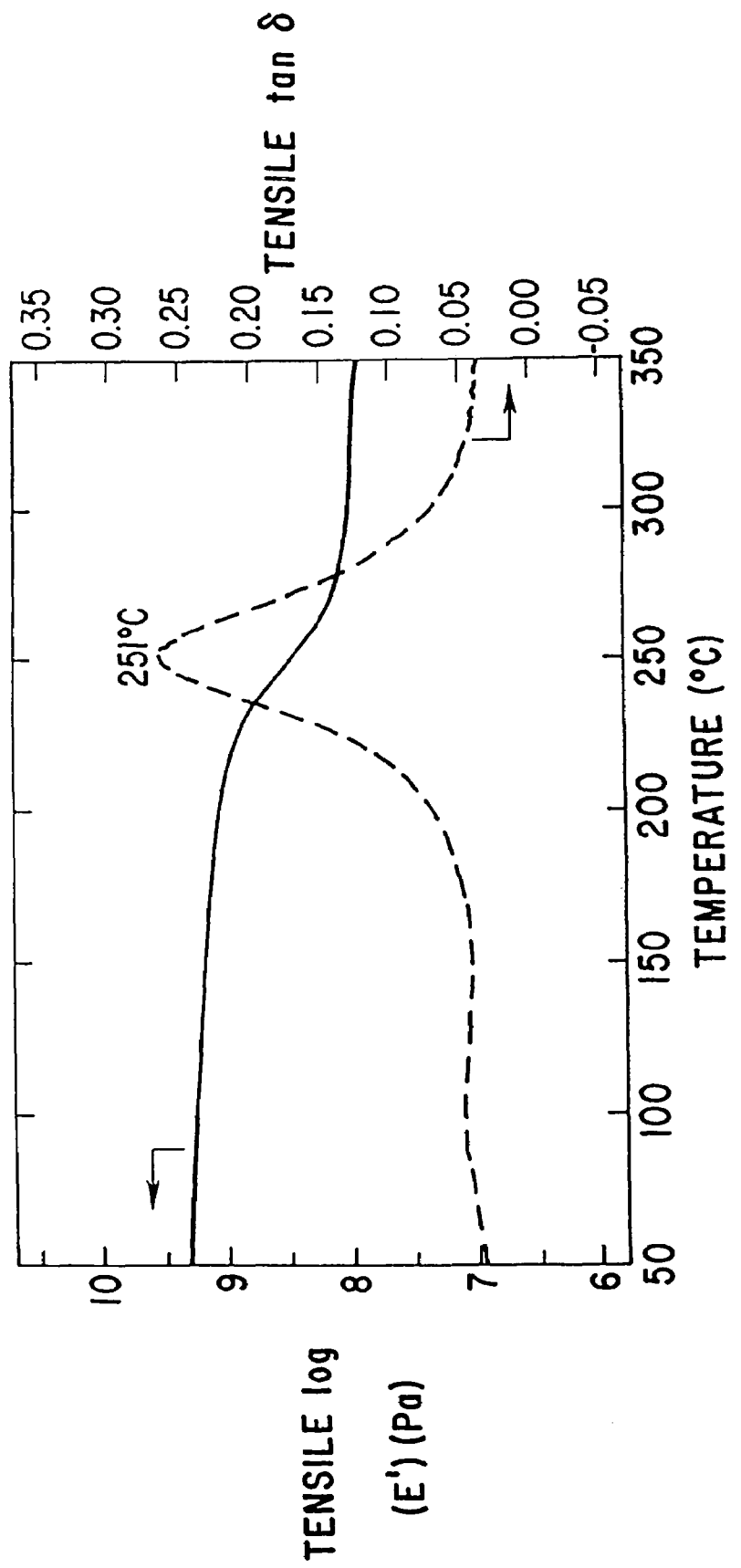

FIG. 8 is a DMTA plot which represents the second thermal scan for a polyaniline base film cast from NMP; This same film was previously scanned as shown in FIG. 7. Film Contains no residual solvent.

Figure 9:
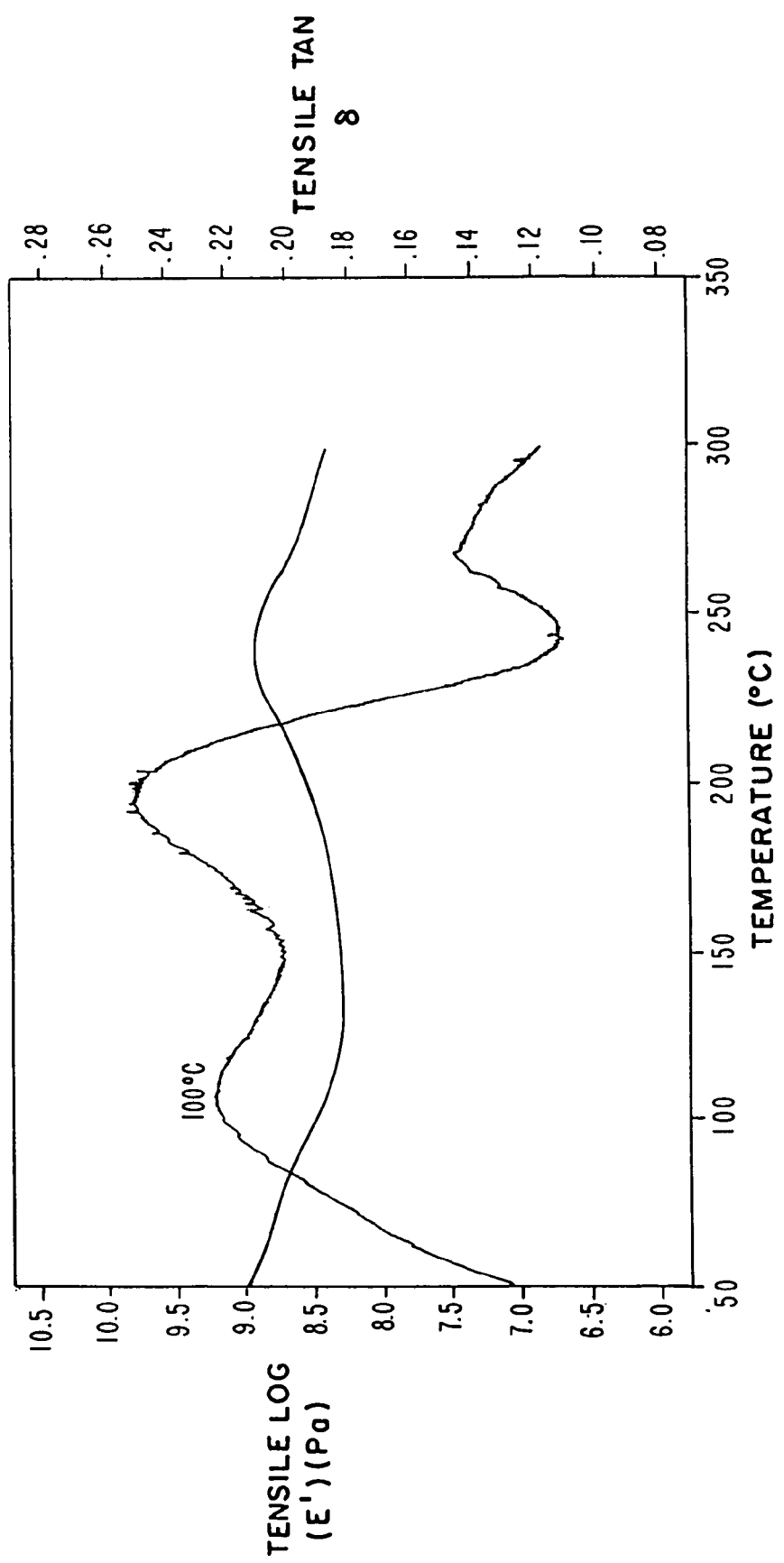

FIG. 9 is a DMTA plot for polyaniline base film cast from NMP and containing 5% poly-co-dimethyl aminopropyl siloxane (5% N content). First Thermal Scan.

Figure 10:
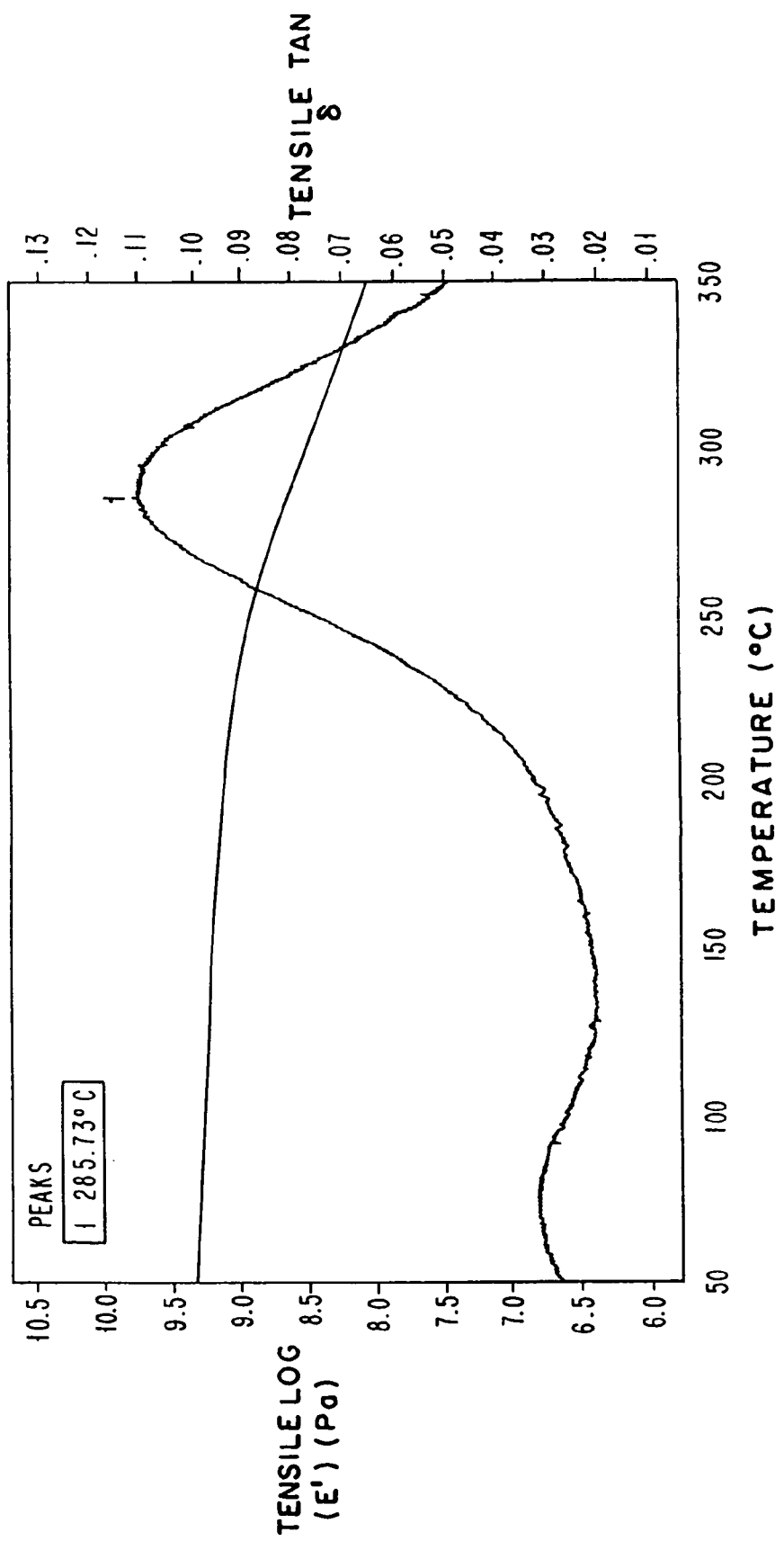

FIG. 10 is a DMTA plot for polyaniline base film cast from NMP and containing 5% poly-co-dimethyl aminopropyl siloxane (5% N content). Second Thermal Scan (this same film was previously scanned as shown in FIG. 9) Film Contains no residual solvent.

Figure 11:
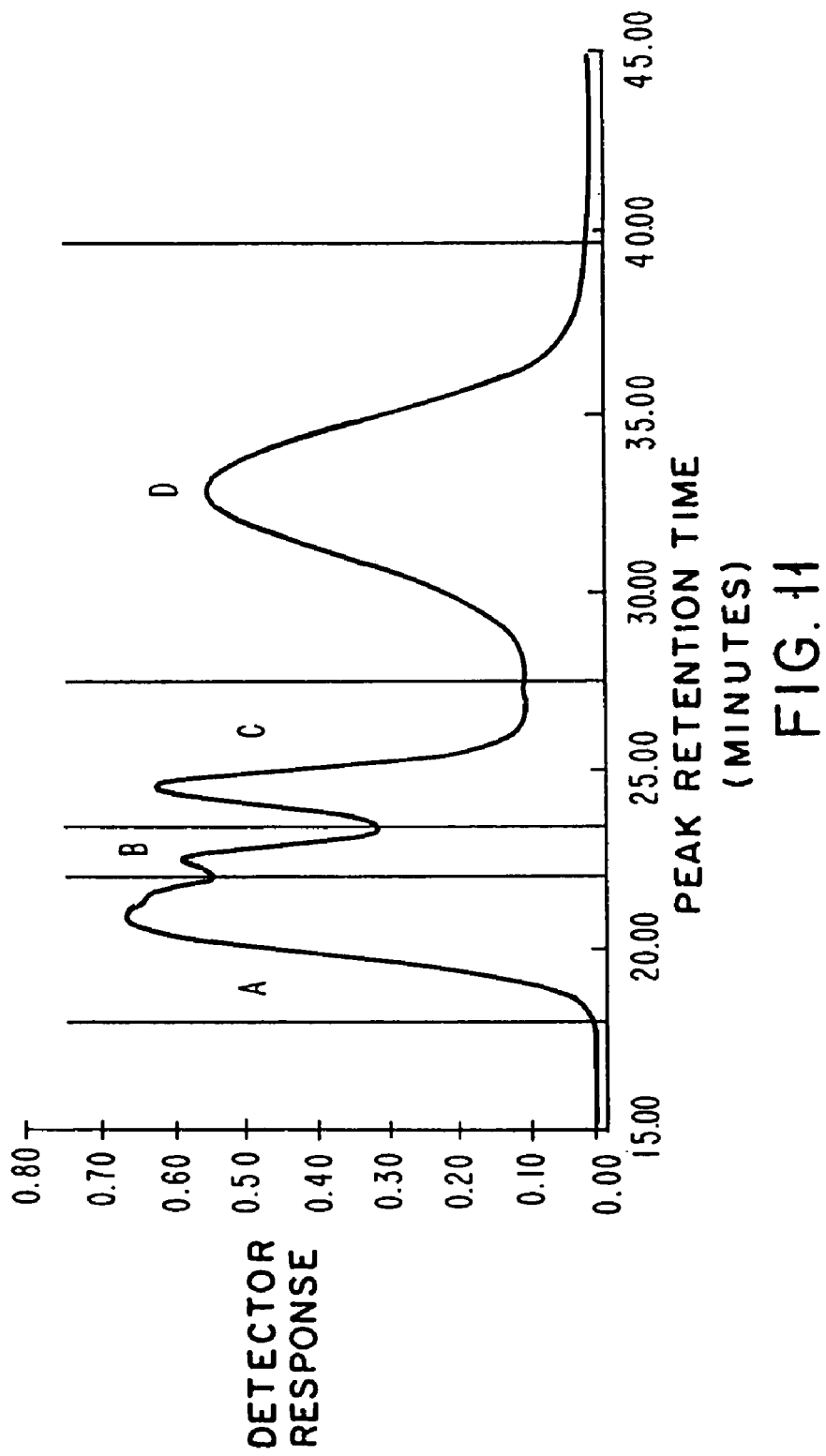

FIG. 11 is a GPC for a polyaniline base solution in NMP containing 5% poly-co-dimethyl aminopropyl siloxane by weight to polyaniline. The polyaniline was 0.1% in NMP.

DETAILED DESCRIPTION

The present invention is directed toward electrically conducting polymer precursors and conducting polymers having adjustable morphology and in turn adjustable physical, and electrical properties. The present invention is also directed toward controlling and enhancing the 3-dimensional order or crystallinity of conducting polymer precursors and of conducting polymers. In addition, the present invention is directed towards enhancing the electrical conductivity of conducting polymers. This is done by forming an admixture of an electrically conducting polymer precursor or an electrically conducting polymer with an additive whereby the additive provides local mobility to the molecules so as to allow the conducting polymer precursor or conducting polymer chains to associate with one another and achieve a highly crystalline state. An example of such an additive is a plasticizer. A plasticizer is a substance which when added to a polymer, solvates the polymer and increases its flexibility, deformability, generally decreases the glass transition temperature Tg, and generally reduces the tensile modulus. In certain cases, the addition of a plasticizer may induce antiplasticization, that is an increase in the modulus or stiffness of the polymer, an increase in Tg. Herein the additives can provide a plasticization effect, an antiplasticization effect or both effects.

Figure 1:
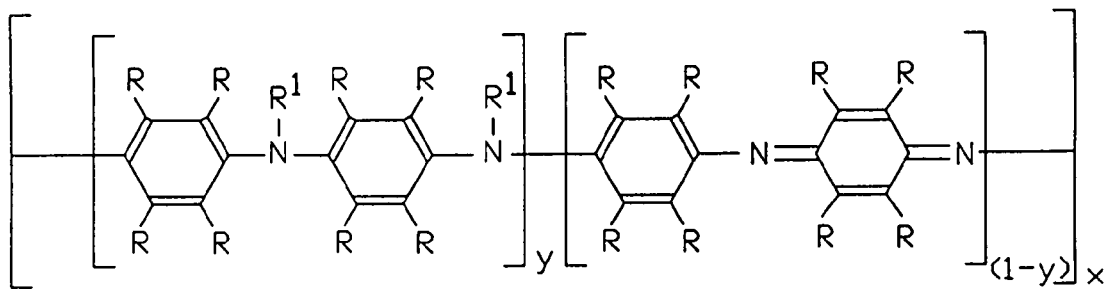
FIG. 1 is a general formula for polyaniline in the non-doped or precursor form.

Examples of polymers which can be used to practice the present invention are of substituted and unsubstituted homopolymers and copolymers of aniline, thiophene, pyrrole, p-phenylene sulfide, azines, selenophenes, furans, thianaphthenes, phenylene vinylene, etc. and the substituted and unsubstituted polymers, polyparaphenylenes, polyparaphenylevevinylenes, polyanilines, polyazines, polythiophenes, poly-p-phenylene sulfides, polyfuranes, polypyrroles, polythianaphthenes, polyselenophenes, polyacctylenes formed from soluble precursors and combinations thereof and copolymers of monomers thereof. The general formula for these polymers can be found in U.S. Pat. No. 5,198,153 to Angelopoulos et al. While the present invention will be described with reference to a preferred embodiment, it is not limited thereto. It will be readily apparent to a person of skill in the art how to extend the teaching herein to other embodiments. One type of polymer which is useful to practice the present invention is a substituted or unsubstituted polyaniline or copolymers of polyaniline having general formula shown in FIG. 1 wherein each R can be H or any organic or inorganic radical; each R can be the same or different; wherein each $R^1$ can be H or any organic or inorganic radical, each $R^1$ can be the same or different; $x \geq 1$; preferable $x \geq 2$ and y has a value from 0 to 1. Examples of organic radicals are alkyl or aryl radicals. Examples of inorganic radicals are Si and Ge. This list is exemplary only and not limiting. The most preferred embodiment is emeraldine base form of the polyaniline wherein y has a value of approximately 0.5. The base form is the non-doped form of the polymer. The non-doped form of polyaniline and the non-doped form of the other conducting polymers is herein referred to as the electrically conducting polymer precursor.

Figure 2:
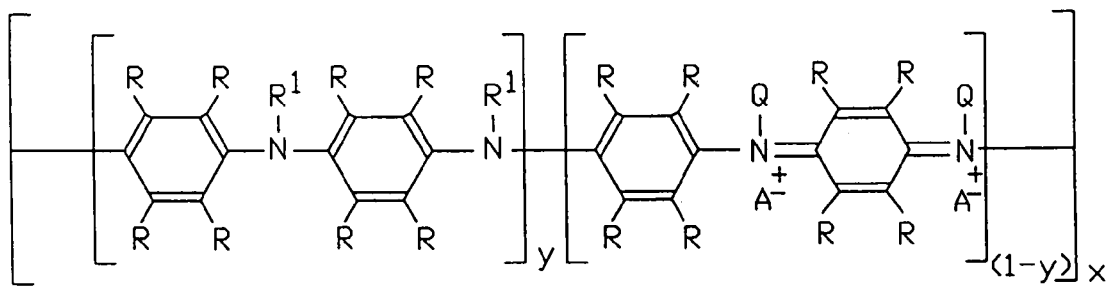
FIG. 2 is a general formula for a doped conducting polyaniline.

In FIG. 2, polyaniline is shown doped with a dopant. In this form, the polymer is in the conducting form. If the polyaniline base is exposed to cationic species QA, the nitrogen atoms of the imine (electron rich) part of the polymer becomes substituted with the Q + cation to form an emeraldinie salt as show in FIG. 2. Q + can be selected from H + and organic or inorganic cations, for example, an alkyl group or a metal.

Figure 3:
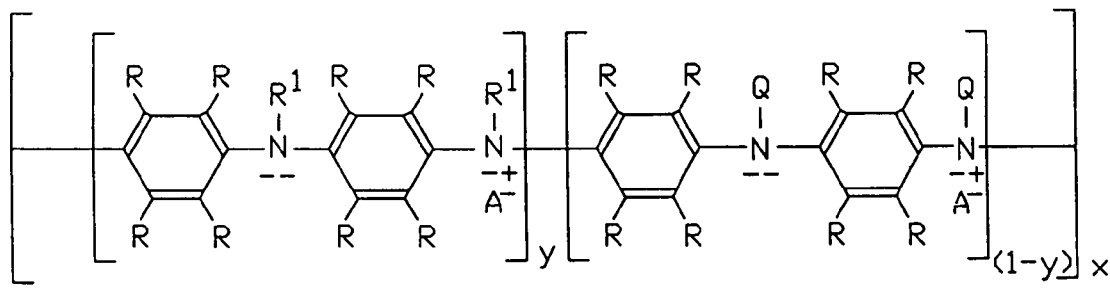
FIG. 3 is a general formula for the polysemiquinone radical cation form of doped conducting polyaniline.

QA can be a protic acid where Q hydrogen. When a protic acid, HA, is used to dope the polyaniline, the nitrogen atoms of the imine part of the polyaniline are protonated. The emeraldine base form is greatly stalbilized by resonance effects. The charges distribute through the nitrogen atoms and aromatic rings making the imine and amine nitrogens indistinguishable. The actual structure of the doped form is a delocalized polysemiquinone radical cation as shown in FIG. 3.

The emeraldine base form of polyaniline is soluble in various organic solvents and in various aqueous acid solutions. Examples or organic solvents are dimethylsulfoxide (DMSO), dimethylformamide (DMF) and N-methylpyrrolidinone (NMP), dimethylene propylene urea, tetramethyl urea, etc. This list is exemplary only and not limiting. Examples of aqueous acid solutions is 80% acetic acid and 60-88% formic acid. This list is exemplary only and not limiting.

Figure 4:
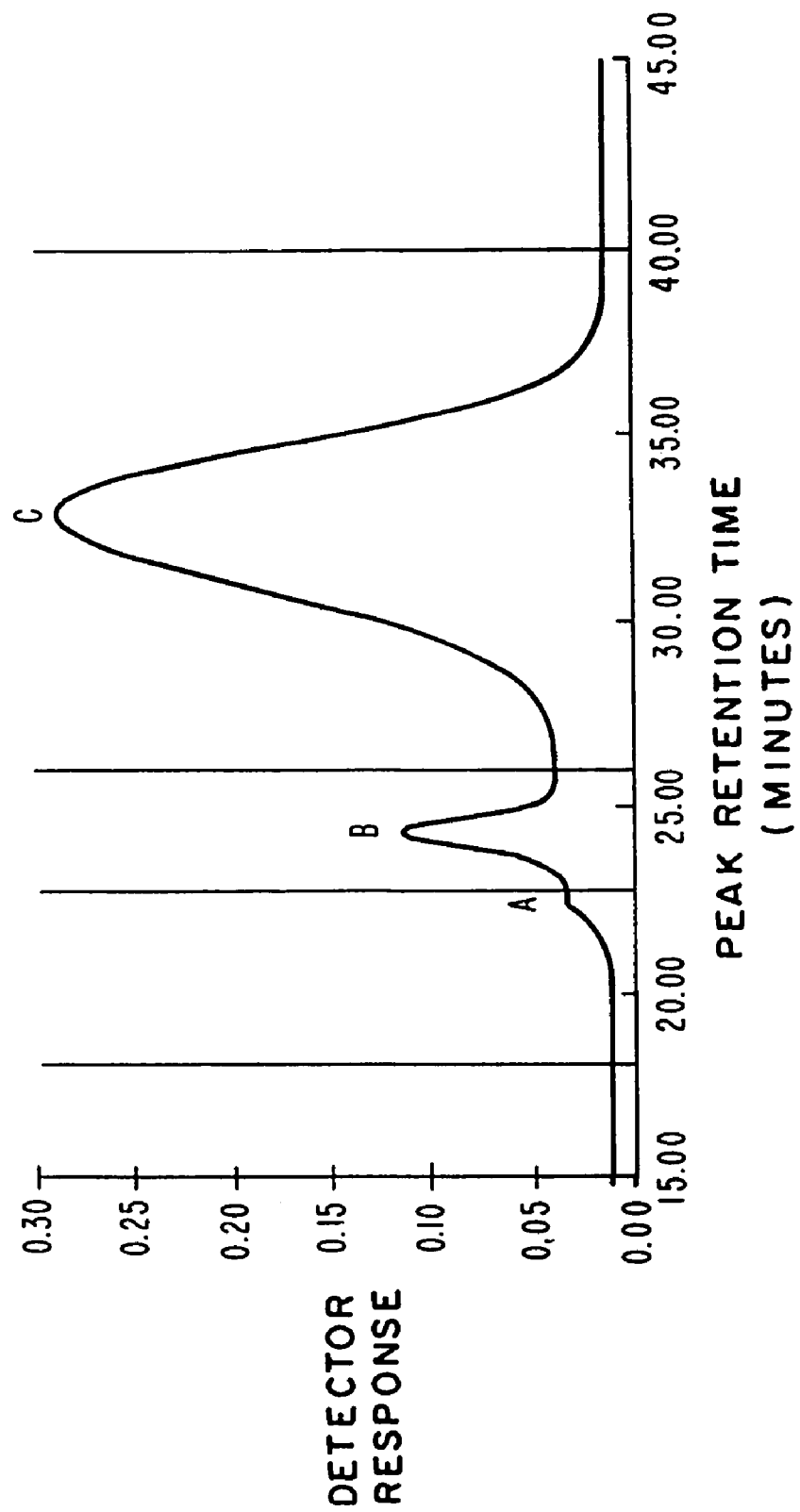
FIG. 4 is a Gel Permeation Chromatograph (GPC) of polyaniline base in NMP (0.1%): GPC shows a trimodal distribution—A very high molecular weight fraction (approx. 12%) and a major peak having lover molecular weight.

Polyaniline base is generally processed by dissolving the polymer in NMP. These solutions exhibit a bimodal or trimodal distribution in Gel Permeation Chromatography (GPC) as a result of aggregation induced by internal hydrogen bonding between chains as previously described in U.S. patent application Ser. No. 08/370,128, filed on Jan. 9, 1995, the teaching of which is incorporated herein by reference. The GPC curve for typical polyaniline base in NMP is shown in FIG. 4.

Polymers in general can be amorphous, crystalline, or partly crystalline. In the latter case, the polymer consists of crystalline phases and amorphous phases. The morphology of a polymer is very important in determining the polymer's physical, mechanical, and electronic properties.

Figure 5:
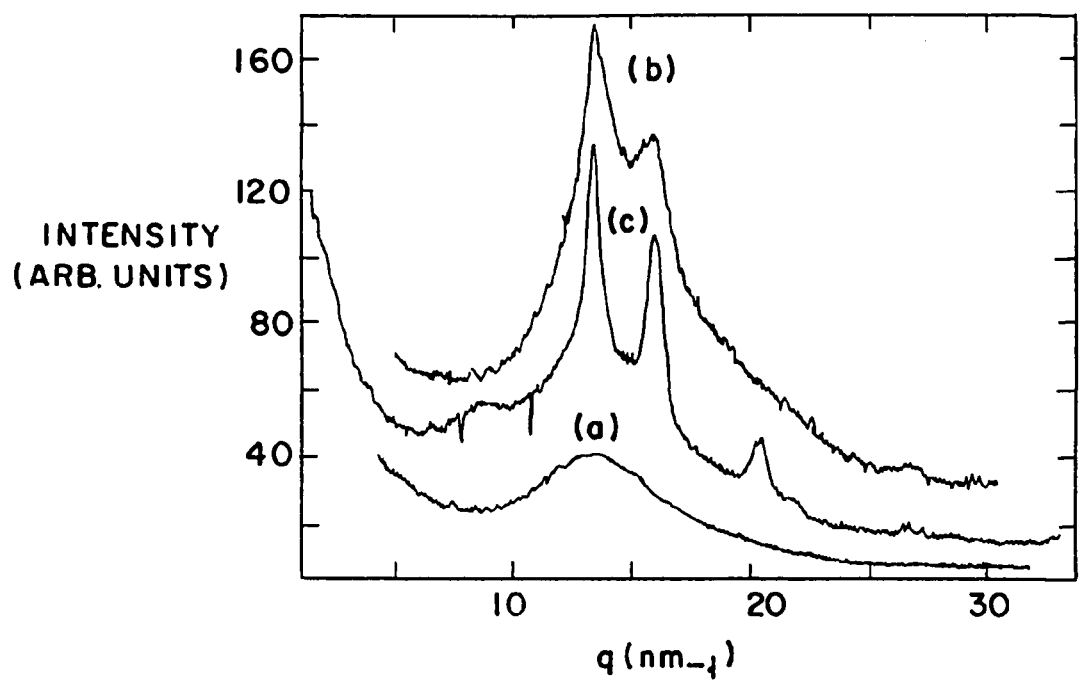

Polyaniline base films processed from NMP either by spin coating or by solution casting techniques are amorphous as can be seen in FIG. 5a which depicts the Wide Angle X-Ray Scattering (WAXS) spectrum for this material. Amorphous diffuse scattering is observed. Some crystallinity is induced in these films by post processing mechanical deformation especially if these films are derived from gels as described by A.G. MacDiarmid et al in Synth. Met. 55-57, 753 (1993), WAXS of a stretch oriented film having been stretched (l/lo=3.7X) derived from a gel is shown in FIG. 5b. Some has been induced as compared to the non-stretch oriented films as evidenced by the defined scattering peaks.

Doping the amorphous polyaniline base films (those having structure shown in FIG. 5a) with aqueous hydrochloric acid results in isotropic conductivity of 1 S/cm. Such films are not crystalline. Similar doping of stretch oriented films results in anisotropic conductivity where conductivity on the order of $10^2$ S/cm is measured parallel to the stretch direction whereas conductivity on the order of $10^0$ S/cm is measured perpendicular to the stretch direction. It should also be noted that some level of crystallinity is lost during the doping process in these films.

According to the present invention, the interchain (polymer chain) registration is increased as compared to a stretch oriented film.

FIGS. 7 and 8 show the dynamic mechanical thermal analysis (DMTA) spectrum for a polyaniline base film processed from NMP alone. FIG. 7 is the first scan where a Tg of approx. 118 is observed as a result of the residual NMP which is present in the film. FIG. 8 is the second thermal scan of the same film. This film has no residual solvent and a Tg of ≅251° C. is measured for the polyaniline base polymer.

When an additive such as a plasticizer, such as a poly-co-dimethyl propylamine siloxane, is added to the polyaniline base completely different properties and morphology is observed. The siloxane has a polar amine group which facilitates the miscibility of the polyaniline base and the plasticizer. The DMTA of a polyaniline base film cast from NMP and containing 5% by weight to polyaniline of the poly-co-dimethyl propyl amine siloxane exhibits a lower Tg on the first thermal scan as compared to polyaniline base processed from NMP alone (FIG. 9) as a result of plasticization induced by the siloxane. However, on the second thermal scan of this film (FIG. 10), the polymer exhibits an increase in Tg as compared to polyaniline processed from NMP. When the polysiloxane is added to a solution of polyaniline base, the siloxane due to the polar amine group can interact with the polymer chains and disrupt some of the polyaniline interactions with itself or some of the aggregation. Thus, the polysiloxane first induces some deaggregation. However, the polysiloxane has multiple amine sites and thus, it can itself hydrogen bond with multiple polyaniline base chains and thus, the polysiloxane facilitates the formation of a cross-linked network. This cross-linked network accounts for the increased Tg observed in the DMTA. Tg is characteristic of the amorphous regions of a polymer and in this case the amorphous regions consist of a cross-linked polyaniline/polysiloxane network. Thus, the polysiloxane is inducing an antiplasticization effect in polyaniline base as the Tg is increased. Generally, plasticizers reduce Tg. GPC data (FIG. 11) is consistent with this model. The addition of the poly-amino containing siloxane to a polyaniline base solution in NMP results in a significant increase in the high molecular weight fractions depicting the cross-linked network which forms between polyanilie and the plasticizer.

In addition to the cross-linked network the siloxane induces in the amorphous regions, concomittantly it also is found to induce significant levels of crystallinity in polyaniline base as a result of the local mobility that it provides. FIG. 5c shows the WAXS for a polyaniline base film processed from NMP containing 10% of the poly amino containing siloxane. As can be seen highly crystalline polyaniline has bee attained. Much higher levels of crystallinity as compared to FIG. 5b for the stretch oriented films.

Thus polyaniline by the addition of the siloxane forms a structure depicted in FIG. 6 where crystalline regions of highly associated polyaniline chains (outlined by a rectangle) are formed with intersticial amorphous regions. In most cases, the additive resides in the amorphous intersticial sites. The degree of crystallinity (number of crystalline sites) and the size of the crystalline domains as well as the degree of amorphous regions and the nature of the amorphous region (aggregated, i.e. cross-linked or not) can be tuned by the type and amount of additive. In turn, by controlling the above, the properties of the material can also be controlled.

With the poly-co-dimethyl aminopropyl siloxane (5% N content), loadings ranging from 0.001 to 20% by weight gives highly crystalline polyaniline. The highly crystalline polyaniline in turn exhibits increased modulus, stiffness, yield and tensile strengths, hardness, density and softening points. Thus, the siloxane at these loadings is having an antiplasticization effect. Above 20% loading, the crystallinity begins to decrease. As the crystallinity decreases, the modulus, stiffness, Yield and tensile strengths, hardness, density and softening points begin to decrease. Thus, the siloxane at these loadings begins to have a plasticization effect. The siloxane content becomes high enough that it disrupts the polyaniline base interactions in the crystalline regions. With the poly co dimethyl aminopropyl siloxanes having 0.5 and 13% N ratios, similar trends are observed but the particular amount of siloxane needed to have a plasticization effect or an antiplasticization effect varies. Thus, the degree of crystallinity and the degree of amorphous regions and in turn the properties of polyaniline can be tuned by the nature of the additive as well as the amount of additive. Indeed, using the same additive but simply changing the loading dramatically changes the morphology and in turn the properties of polyaniline.

The electronic properties of the polymer are also impacted. The conductivity of a polyaniline base film cast from NMP and containing 1% by weight poly-co-dimethyl aminopropyl siloxane which is doped by aqueous hydrochloric acid is 50 S/cm as compared to 1 S/cm for a polyaniline film with no plasticizer. This is isotropic conductivity. The doped film containing the polysiloxane retains the highly crystalline structure.

The degree of crystallinity and the degree of amorphous regions and in turn the physical, mechanical, and electronic properties can be tuned by the particular additive used and by the amount of additive. For example, the Tg of polyaniline can be increased or decreased by the amount and type of additive. The mechanical properties such as tensile properties, modulus, impact resistance, etc. can be tuned as described above. The additive can range from 0.001 to 90% by weight, more preferably from 0.001 to 50% and most preferably from 0.001 to 25%. A list of plasticizers that can be used to practice the present invention is given in Table 1. The additive can also be removed from the final film structure if so desired by appropriate extraction.

SPECIFIC EXAMPLES

Polyaniline Synthesis Polyaniline is synthesized by the oxidative polymerization of aniline using ammonium peroxydisulfate in aqueous hydrochloric acid. The polyaniline hydrochloride precipitates from solution. The polymer is then neutralized using aquoeous ammonium hydroxide. The neutralized or non-dope polyaniline base is then filtered, washed and dried. Polyaniline can also be made by electrochemical oxidative polymerization as taught by W. Huang, B. Humphrey, and A. G. MacDiarmid, J. Chem. Soc., Faraday Trans. 1, 82, 2385, 1986.

Polyaniline Base in NMP: The polyaniline base powder is readily dissolved in NMP up to 5% solids. Thin films (on the order of a micron) can be formed by spin-coating. Thick films are made by solution casting and drying (70° C. in vacuum oven under a nitrogen purge for 15 hours). These solutions and films have the properties described above.

Polyaniline Base in NMP/Plasticizer a. Polyaniline Base was first dissolved in NMP to 5% solids and allowed to mix well. A poly-co-dimethyl, aminopropyl siloxane (N content 5% relative to repeat unit) was dissolved to 5% in NMP. The siloxane solution was added to the polyaniline base solution. The resulting admixture was allowed to mix for 12 hours at room temperature. A number of solutions were made having from 0.001% to 50% siloxane content (by weight relative to polyaniline). Thin films were spin-coated onto quartz substrates; Thick films were prepared by solution casting and baking the solutions at 70° C. in a vacuum oven under a Nitrogen purge for 15 hours). The solutions and the films have the properties described above.

b. The same experiment described in (a) was carried out except that the plasticizer was a poly-co-dimethyl, aminopropyl siloxane in which the N content was 13%.

c. The same experiment described in (a) was carried out except that the plasticizer was a poly-co-dimethyl, aminopropyl siloxane in which the N content was 0.5%.

d. The same experiment described in (a) was carried out except that the plasticizer was polyglycol diacid.

e. The same experiment described in (a) was carried out except that the plasticizer was 3,6,9-trioxaundecanedioic acid.

f. The same experiment described in (a) was carried out except that the plasticizer was poly(ethylene glycol) tetrahydro furfuryl ether.

g. The same experiment described in (a) was carried out except that the plasticizer was glycerol triacetate.

h. The same experiment described on (a) was carried out except the plasticizer was epoxidized soy bean oil.

Polyaniline Base in NMP/m-Cresol/Plasticizer

The same experiment as described in (a) was carried out except that polyaniline base and the plasticizer was dissolved in NMP/m-Cresol mixtures in which m-Cresol ranged from 1 to 99%

Polyaniline Base in m-Cresol/Plasticizer

The same experiment as described in (a) was carried out except that the polyaniline base was dissolved in m-Cresol and the plasticizer was dissolved in m-Cresol.

Polyaniline Base in m-Cresol and in NMP/m-Cresol

Polyaniline Base was dissolved in m-Cresol and in NMP/m-Cresol combinations to 5% solids. The m-Cresol in the latter system being the additive ranged from 1 to 99%. Free-Standing films were made by solution casting techniques. With increasing m-cresol content, the polyaniline exhibited a WAXS similar to that shown in FIG. 5a except that the amorphous scattering peak became somewhat sharper indicative of some crystallinity. However, this was significantly less than observed with the siloxane plasticizer.

Doped Polyanilines a 1. Hydrochloric Acid and/or Methanesulfonic Acid Doped Films Polyaniline base films made as described above were doped by aqueous acid solutions of hydrochloric or methanesulfonic acid. The films were immersed in the acid solution for 12 hours for thin films and 36 hours for the thick films. The conductivity of a polyaniline base film processed from NMP and doped with these acid solutions is 1 S/cm The conductivity of a base film processed from NMP and 1% poly-co-dimethyl, amiopropyl siloxane (5% N content) was 50 S/cm.

2. Sulfonic Acid Doped Polyanilines

Polyaniline Base was dissolved in a solvent such as NMP or NMP/m-Cresol combinations, etc. from 1 to 5% solids. To this solution was added a dopant such camphorsulfonic acid or acrylamidopropanesulfonic acid (previously reported in U.S. patent application Ser. No. 595,853 filed on Feb. 2, 1996). These solutions were used to spin-coat or solution cast films. In some experiments, the plasticizer such as the poly-co-dimethyl, aminopropyl siloxane in a solvent was added to the doped polyaniline solution. In certain other experiments, the plasticizer was first added to the pani base solution. The dopant was then added to the polyaniline solution containing the plasticizer.

The teaching of the following U.S. Patent Applications are incorporated herein by reference:

"CROSS-LINKED ELECTRICALLY CONDUCTIVE POLYMERS, PRECURSORS THEREOF AND APPLICATIONS THEREOF", application Ser. No. 595,853, filed Feb. 2, 1996 now U.S. Pat. 6,193,909;

"METHODS OF FABRICATION OF CROSS-LINKED ELECTRICALLY CONDUCTIVE POLYMERS AND PRECURSORS THEREOF", application Ser. No. 594,680, filed Feb. 2, 1996 now U.S. Pat. No. 6,030,550

"DEAGGREGATED ELECTRICALLY CONDUCTIVE POLYMERS AND PRECURSORS THEREOF", application Ser. No. 370,127, filed Jan. 9, 1995 now U.S. Pat. No. 5,804,100; and "METHODS OF FABRICATION OF DEAGGREGATED ELECTRICALLY CONDUCTIVE POLYMERS AND PRECURSORS THEREOF", application Ser. No. 370,128, filed Jan. 9, 1995 now U.S. Pat. No. 6,087,472.

While the present invention has been shown and described with respect to a preferred embodiment, it will be understood that numerous changes, modifications, and improvements will occur to those skilled in the art without departing from the spirit and scope of the invention.

TABLE I

| PLASTICIZERS |
| --- |
| ADIPIC ACID DERIVATIVES |
| Dicapryl adipate |
| Di-(2-ethylhexyl) adipate |
| Di(n-heptyl, n-nonyl) adipate |
| Diisobutyl adipate |
| Diisodecyl adipate |
| Dinomyl adipate |
| Di-(tridecyl) adipate |
| AZELAIC ACID DERIVATIVES |
| Di-(2-ethylheyl azelate) |
| Diisodecyl azelate |
| Diisoctyl azelate |
| Dimethyl azelate |

TABLE I-continued

| PLASTICIZERS |
| --- |
| Di-n-hexyl azelate |
| BENZOIC ACID DERIVATIVES |
| Diethylene glycol dibenzoate |
| Dipropylene glycol dibenzoate |
| Polyethylene glycol 200 dibenzoate |
| CITRIC ACID DERIVATIVES |
| Acetyl tri-n-butyl citrate |
| Acetyl triethyl citrate |
| Tri-n-butyl citrate |
| Triethyl citrate |
| DIMER ACID DERIVATIVES |
| Bis-(2-hydroxyethyl dimerate) |
| EPOXY DERIVATIVES |
| Epoxidized linseed oil |
| Epoxidized soy bean oil |
| 2-Ethylhexyl epoxytallate |
| n-Octyl expoxystereale |
| FUMARIC ACID DERIVATIVES |
| Dibutyl fumarate |
| GLYCEROL DERIVATIVES |
| Glycerol triacetate |
| ISOBUTYRATE DERIVATIVE |
| 2,2,4-Trimethyl-1,3-pentanediol Diisobutyrate |
| ISOPHTHALIC ACID DERIVATIVES |
| Di-(2-ethylhexyl) isophthalate |
| Dimethyl isophthalate |
| Diphenyl isophthalate |
| LAURIC ACID DERIVATIVES |
| Methyl laurate |
| LINOLEIC ACID DERIVATIVE |
| Methyl linoleate, 75% |
| MALEIC ACID DERIVATIVES |
| Di-(2-ethylhexyl) maleate |
| Di-n-butyl maleate |
| MELLITATES |
| Tricapryl trimellitate |
| Tri-(2-ethylhexyl) trimellitate |
| Triisodecyl trimellitate |
| Tri-(n-octyl,n-decyl) trimellitate |
| MYRISTIC ACID DERIVATIVES |
| Isopropyl myristate |
| OLEIC ACID DERIVATIVES |
| Butyl oleate |
| Glycerol monooleate |
| Glycerol trioleate |
| Methyl oleate |
| n-Propyl oleate |
| Tetrahydrofurfuryl oleate |
| PALMITIC ACID DERIVATIVES |
| Isopropyl palmitate |
| Methyl palmitate |
| PARAFFIN DERIVATIVES |
| Chloroparaffin, 41% Cl |
| Chloroparaffin, 50% Cl |
| Chloroparaffin, 60% Cl |
| Chloroparaffin, 70% Cl |
| PHOSPHORIC ACID DERIVATIVES |
| 2-Ethylhexyl diphenyl phosphate |
| Isodecyl diphenyl phosphate |

TABLE I-continued

PLASTICIZERS

4-Butylphenyl diphenyl phosphate
Tri-butoxyethyl phosphate
Tributyl phosphate
Tricresyl phosphate
Triphenyl phosphate
PHTHALIC ACID DERIVATIVES Butyl benzyl phthalate
Butyl octyl phthalate
Dicapryl phthalate
Dicyclohexyl phthalate
Di-(2-ethylhexyl) phthalate
Diethyl phthalate
Dihexyl phthalate
Diisobutyl phthalate
Diisodecyl phthalate
Diisononyl phthalate
Diisooctyl phthalate
Dimethyl phthalate
Ditridecyl phthalate
Diundecyl phthalate
RICINOLEIC ACID DERIVATIVES Butyl ricinoleate
Glyceryl tri(acetyl) ricinoleate)
Methyl acetyl ricinoleate
Methyl ricinoleate
n-Butyl acetyl ricinoleate
Propylene glycol ricinoleate
SEBACIC ACID DERIVATIVES Dibutyl sebacate
Di-(2-ethylhexyl) sebacate
Dimethyl sebacate
STEARIC ACID DERIVATIVES Ethylene glycol monostearate
Glycerol monostearate
Isopropyl isostearate
Methyl stearate
n-Butyl stearate
Propylene glycol monostearate
SUCCINIC ACID DERIVATIVES Diethyl succinate
SULFONIC ACID DERIVATIVES N-Ethyl o,p-toluenesulfonamide
o,p-toluenesulfonanamide
Polyesters adipic acid polyester
Paraplex G-40
adipic acid polyester
Santicizer 334F
azelaic acid polyester
Plastolein 9720)
azelaic acid polyester
Plastolein 9750
sebacic acid polyester
Paraplex G-25
Sucrose derivatives sucrose acetate-isobutyrate (SAIB)
Tartaric acid derivative dibutyl tartrate
Terephthalic acid derivative bis(2-ethylhexyl) terephthalate (DOTP)
Trimellitic acid derivatives tris(2-ethylhexyl) trimellitate (TOTM)
heptyl nonyl trimellitate
heptyl nonyl undecyl trimellitate
triisodecyl trimellitate
Glycol derivatives TABLE I-continued

PLASTICIZERS diethylene glycol dipelargonate
triethylene glycol di-2
ethylbutyrate
poly(ethylene glycol) (200) di-2-
ethylhexanoate
Glycolates methyl phthalyl ethyl glycolate
butyl phthalyl butyl glycolate
Hydrocarbons hydrogenated terphenyls HB-40
poly(alkyl naphthalene)s Panaflex
aliphatic aromatics Leromoll
chlorinated paraffin (52 wt % Cl),
Cereclor S-52
Terpenes and Derivatives Camphor
Hydrogenated methyl ester or rosin
Phosphonic Acid Derivatives Chlorinated Polyphosphanate
Siloxanes Polydimethyl siloxane
Polyco-dimethyl/propylamine siloxanes with various amount of
propylamine content
Polydiphenylsiloxanes
Polyco-dimethylphenyl siloxanes
Silanol terminated polysiloxanes
Amino terminated polysiloxanes
Epoxy terminated polysiloxanes
Carbirol terminated polysiloxanes
Polysilanes

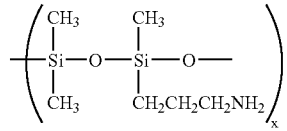

Glycols

Polyethylene glycol
Poly(ethylene glycol) tetrahydrofurfuryl ether
Poly(ethylene glycol) bis(carboxymethyl) ether
3.6.9-trioxadecanoic acid
3.6.9-trioxaundecanedioic acid
Polyglycol diacid

What is claimed is:
1. A structure comprising:
a polycrystalline material comprising crystallites of polymers with intersticial regions therebetween;
wherein said polymer is an electrically conductive polymer;
said interstitial regions between said crystallites comprising amorphous material comprising an additive;
said additive provides mobility to said polymer to allow said polymer to associate with one another to achieve said crystallites;
said polycrystalline material is characterized by a degree of crystalinity and a degree of amorphous regions, said degree of polycrystallinity and said degree of amorphous regions are selected by selecting the composition of said additive and the amount of said additive; and
wherein said additive is a plasticizer selected from the group consisting of:
Adipic acid derivatives Sebacic acid derivatives

Azelaic acid derivatives Stearic acid derivatives
Benzoic acid derivatives Diethyl succinate
Citric acid derivatives N-Ethyl o,p-tolusnesulfonamide
Dimer acid derivatives o,p-toluenesulfonanamide
Epoxy derivatives Terpentines
Fumaric acid derivatives Terpentine derivatives
Glycerol triacetate Siloxanes
Isobutyrate derivatives Polysiloxanes
Isophthalic acid derivatives Ethylene glycols
Lauric acid derivatives Polyethylene glycols
Linoleic acid derivative Polyesters
Maleic acid derivative Sucrose derivatives
Mellitates Tartaric acid derivative
Myristic acid derivatives Terephthalic acid derivative
Oleic acid derivatives Trimellitic acid derivatives
Palmitic acid derivatives Glycol derivatives
Paraffin derivatives Glycolates
Phosphoric acid derivatives poly(alkyl naphthalene)s
Phthalic acid derivatives aliphatic aromatics
Ricinoleic acid derivatives Phosphonic acid derivatives
Polysilanes.

2. A structure according to claim 1, wherein said structure is electrically conductive and has an isotropic electrical conductivity.

3. A structure according to claim 1, wherein said polymer is selected from the group consisting of substituted and unsubstituted polyparaphenylene vinylenes, polyparaphenylenes, polyanilines, polythiophenes, polyazines, polyfuranes, polypyrroles, polyselenophenes, poly-p-phenylene sulfides, polyacetylenes formed from soluble precursors, combinations thereof and blends thereof with other polymers and copolymers of the monomers thereof.

4. A structure according to claim 1, wherein said structure has crytallinity greater than about 25%.

5. A structure according to claim 1, wherein the amount of said additive is adjustable.

6. A structure according to claim 5, wherein said amount is controlled to modify physical properties of said structure.

7. A structure according to claim 6, wherein said physical properties are selected from the group consisting of glass transition temperature, compliance, thermal coefficient of expansion, modulus, yield and tensile strength, hardness, density.

8. A structure according to claim 1, wherein said crystallites have a size greater than about 80Å.

9. A structure according to claim 1, wherein the amorphous material in the intersticial regions contains crosslinks.

10. A structure according to claim 1, wherein the amorphous material in the intersticial regions are deaggregated.

11. A structure according to claim 1, wherein the additive is in an amount for about 0.001% to about 90% by weight.

12. A structure according to claim 1, wherein said structure is selected from the group consisting of an electrostatic discharge layer, is a wire, is a solder, is an electromagnetic interference shield, is a semiconductor device, and a corrosion protection coating.

13. A structure according to claim 1, wherein said amorphous regions have crystalline order.

14. A structure according to claim 1, wherein said additive has a different material composition from said polycrystalline material.

15. A structure comprising:
a polycrystalline material comprising crystallites of polymers with intersticial regions therebetween;
said polymer is an electrically conductive polymer;
said intersticial regions comprise an amorphous material selected from the group consisting of said polymers;
said amorphous material includes an additive;
said polycrystalline material is characterized by a degree of crystalinity and a degree of amorphous regions, said degree of polycrystallinity and said degree of amorphous regions are selected by selecting the composition of said additive and the amount of said additive; and
wherein said additive is a plasticizer selected from the group consisting of:
Adipic acid derivatives Sebacic acid derivatives
Azelaic acid derivatives Stearic acid derivatives
Benzoic acid derivatives Diethyl succinate
Citric acid derivatives N-Ethyl o,p-tolusnesulfonamide
Dimer acid derivatives o,p-toluenesulfonanamide
Epoxy derivatives Terpentines
Fumaric acid derivatives Terpentine derivatives
Glycerol triacetate Siloxanes
Isobutyrate derivatives Polysiloxanes
Isophthalic acid derivatives Ethylene glycols
Lauric acid derivatives Polyethylene glycols
Linoleic acid derivative Polyesters
Maleic acid derivative Sucrose derivatives
Mellitates Tartaric acid derivative
Myristic acid derivatives Terephthalic acid derivative
Oleic acid derivatives Trimellitic acid derivatives
Palmitic acid derivatives Glycol derivatives
Paraffin derivatives Glycolates
Phosphoric acid derivatives poly(alkyl naphthalene)s
Phthalic acid derivatives aliphatic aromatics
Ricinoleic acid derivatives Phosphonic acid derivatives
Polysilanes.

16. A structure according to claim 15, wherein said polymer is an electrically conductive polymer and said polycrystalline material has a conductivity which is isotropic.

17. A structure according to claim 15, wherein said polymer is selected from the group consisting of substituted and unsubstituted polyparaphenylene vinylenes, polythianophthenes, polyparaphenylenes, polyanilines, polythiophenes, polyazines, polyfuranes, polypyrroles, polyselenophenes, poly-p-phenylene sulfides, polyacetylenes formed from soluble precursors, combinations thereof and blends thereof with other polymers and copolymers of the monomers thereof.

18. A structure according to claim 15, wherein said crystallites have a size greater than about 80Å.

19. A structure comprising:
a polycrystalline material comprising crystallites of polyaniline with intersticial regions therebetween;
said polyaniline is an electrically conductive polyaniline;
said intersticial regions comprise an amorphous material selected from the group consisting of polyaniline;
said amorphous material includes an additive in an amount from about 0.001% to about 90% by weight;
said polycrystalline material is characterized by a degree of crystalinity and a degree of amorphous regions, said degree of polycrystallinity and said degree of amorphous regions are selected by selecting the composition of said additive and the amount of said additive; and
wherein said additive is a plasticizer selected from the group consisting of:
Adipic acid derivatives Sebacic acid derivatives
Azelaic acid derivatives Stearic acid derivatives
Benzoic acid derivatives Diethyl succinate
Citric acid derivatives N-Ethyl o,p-tolusnesulfonamide
Dimer acid derivatives o,p-toluenesulfonanamide
Epoxy derivatives Terpentines
Fumaric acid derivatives Terpentine derivatives
Glycerol triacetate Siloxanes Isobutyrate derivatives Polysiloxanes
Isophthalic acid derivatives Ethylene glycols
Lauric acid derivatives Polyethylene glycols
Linoleic acid derivative Polyesters
Maleic acid derivative Sucrose derivatives
Mellitates Tartaric acid derivative
Myristic acid derivatives Terephthalic acid derivative
Oleic acid derivatives Trimellitic acid derivatives
Palmitic acid derivatives Glycol derivatives
Paraffin derivatives Glycolates
Phosphoric acid derivatives poly(alkyl naphthalene)s
Phthalic acid derivatives aliphatic aromatics
Ricinoleic acid derivatives Phosphonic acid derivatives
Polysilanes.

* * * * *